No. 837,551. PATENTED DEC. 4,
A. F. EELLS.
METHOD OF SEA SOUNDING.
APPLICATION FILED MAR. 20, 1906.
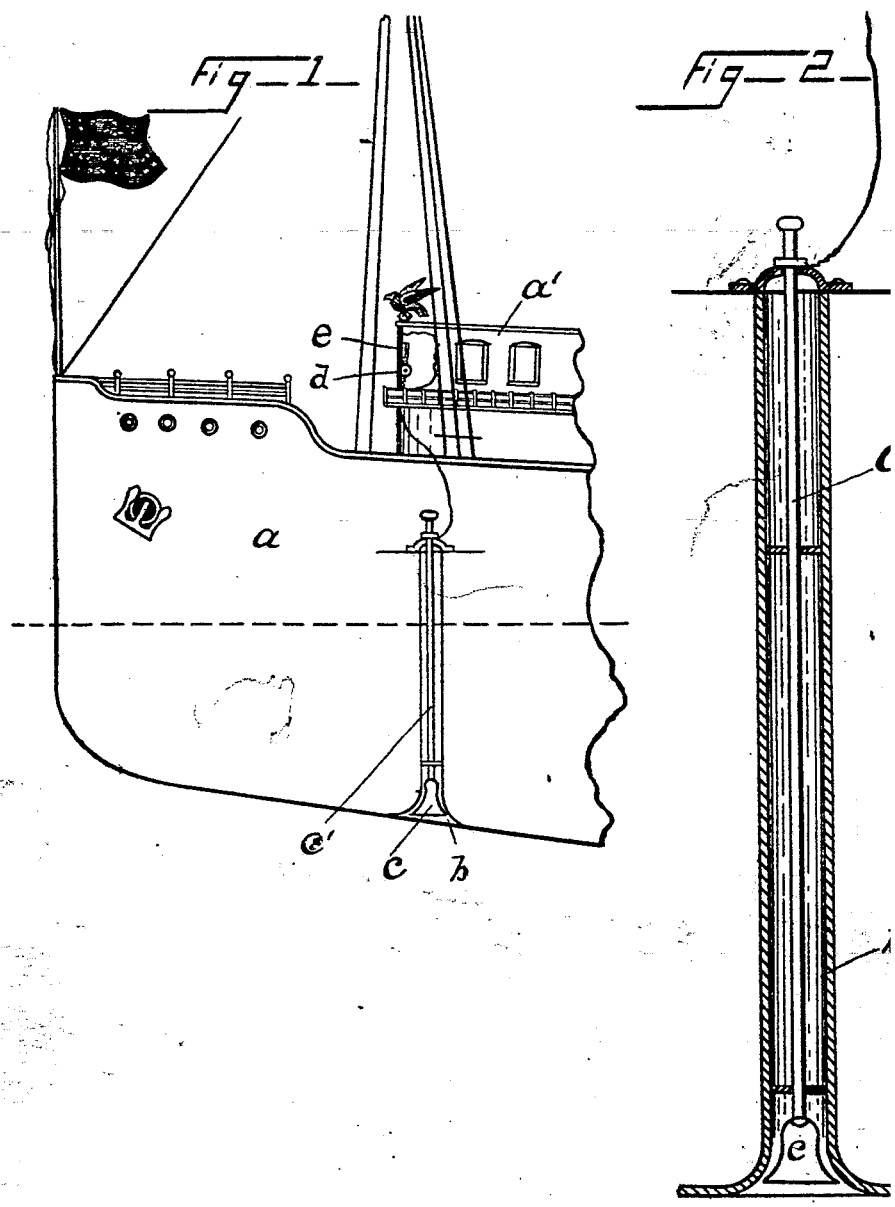
Witnesses
Frank C. Palmer.
Frank S. Dewire.
Albert F. Ee

UNITED STATES PATENT OFFICE.

ALBERT F. EELLS, OF BOSTON, MASSACHUSETTS.

METHOD OF SEA-SOUNDING.

No. 837,551.　　　Specification of Letters Patent.　　　Patented Dec. 4, 1906.

Application filed March 20, 1906. Serial No. 307,132.

*To all whom it may concern:*

Be it known that I, ALBERT F. EELLS, a citizen of the United States, residing at Boston, in the county of Suffolk and State of Massachusetts, have invented a certain new and useful Improvement in Methods of Sea-Sounding, which improvement is fully described in the following specification, reference being had to the accompanying sheet of drawings.

This invention has for its object the production of a simple and effective method of automatically determining and indicating sea-soundings without the use of line, wire, or other tangible means of connecting a ship with the bottom of the sea.

Briefly described, my present invention consists in determining the distance between a ship's keel and the bottom of the sea either by utilizing the echo from a sound made on shipboard or by the return of an impulse due to the disturbance of the water at or near the surface of said water.

In the accompanying drawings, Figure 1 is a side elevation, chiefly in outline, indicating a portion of a ship having applied thereto an illustrative form of apparatus which may be used with my present invention; and Fig. 2 is a relatively enlarged sectional view of a tube extending, as here shown, from the main deck of the vessel to the bottom thereof, in which tube is located one element of said apparatus—to wit, a combined sounder and reverberator.

35. Referring to the drawings, the letter *a* indicates the bow portion of a vessel, and *a'* the pilot-house. Extending from the main deck downward through the ship to the bottom of said ship is a tube or well *b*, in the lower end of which is centrally located a bell *c*, said bell being so supported that it is free to vibrate and being, as here shown, attached to and supported by a metallic bar *c'*, that extends upward somewhat above the top of the well *b*, so that the free end of said bar may be struck a sharp blow, either by hand or by some automatic mechanical means, (not shown,) in order to cause the connected bell or other form of reverberator to give forth a sound below the surface of the water. This sound travels to the bottom of the sea and is echoed back and is then indicated by suitable means on shipboard or, if preferred, is received by telephonic means, the depth of water under the vessel being determined by the time which elapses between the strik of the bell and the return of the echo.

The conditions governing the transmiss of sound through water differ materia from those governing the transmission sound through the free atmosphere, it be a well-known fact that while an echo may noted by the ordinary ear at a distance small as one hundred feet in free atmosph an echo cannot be caught by the ordin ear at a distance less than four hundred f under water. This being true, it will be vious that an echo could not be relied up for the purpose of measuring depths than four hundred feet unless some spe provision be made, and this I have provi in the form of what may be regarded as a sistance-coil *d*, consisting, preferably, o wire openly coiled, so that it is free to tra mit the vibrations of the bell resulting fr the reverberation or echo or other impu as the case may be.

The particular means for indicating the turn of the sound or impulse is not mater It may be in the form of an indicator *e*, cated within view of the pilot, or it n be in the form of a sensitive telephone ceiver. Neither is it material that the shall be located inboard, as it would equally effective if hung over the side of vessel with its lower end submerged.

By the use of my described apparatus, particularly if it includes means for strik the resonator or exerting an impulse at quent intervals of time, the depth of w under the vessel is constantly being m known to the pilot, so that the groundin vessels and the serious accidents and los life and property now constantly occur could readily be avoided.

Having thus described my inventio claim as new and wish to secure by Let Patent—

1. In the art of deep-sea sounding, method of determining the depth of the ter by utilizing the return of an impulse to the disturbance of the water in proxir to its surface.

2. In the art of deep-sea sounding, method of determining the depth of w by means of an echo and indicator.

ALBERT F. EELL

Witnesses:
　FRANK H. ALLEN,
　ALFRED MOFFITT.